United States Patent [19]

Aisumi

[11] 3,814,440

[45] June 4, 1974

[54] INTERCHANGEABLE RECORD CHANGER SPINDLE ASSEMBLY

[75] Inventor: Tomoo Aisumi, Osaka, Japan

[73] Assignee: Matsushita Electric Industrial Co., Ltd., Osaka, Japan

[22] Filed: Oct. 26, 1972

[21] Appl. No.: 301,249

[30] Foreign Application Priority Data

Nov. 4, 1971 Japan ................................ 46-88123
Nov. 4, 1971 Japan ................................ 46-88124

[52] U.S. Cl. ................................ 274/10 S
[51] Int. Cl. ................................ G11b 17/04
[58] Field of Search ................................ 274/10 S

[56] References Cited

UNITED STATES PATENTS

| | | | |
|---|---|---|---|
| 2,604,325 | 7/1952 | Hansen | 274/10 S |
| 3,201,131 | 8/1965 | Ansar et al. | 274/10 S |
| 3,216,729 | 11/1965 | Babler | 275/1 S |
| 3,301,563 | 1/1967 | Simpson | 274/10 S |
| 3,396,973 | 8/1968 | Smith | 274/10 S |
| 3,712,630 | 1/1973 | Tajime | 274/10 S |

FOREIGN PATENTS OR APPLICATIONS

| | | | |
|---|---|---|---|
| 908,026 | 10/1962 | Great Britain | 274/10 S |
| 1,213,611 | 11/1959 | France | 274/10 S |

*Primary Examiner*—Harry N. Haroian
*Attorney, Agent, or Firm*—Wenderoth, Lind & Ponack

[57] ABSTRACT

An interchangeable record changer spindle assembly for use in a phonograph or record player in association with records each having a relatively large center hole through which the records are mounted on the record changer spindle assembly in a vertically stacked arrangement. The spindle assembly essentially comprises a housing structure, a slider block vertically slidably housed within the housing structure and pivotally carrying a pair of supporting members for supporting the lowermost one of the records when the slider block is in an upwardly shifted position and for permitting the lowermost record to fall on to the phonograph turntable when in a downwardly shifted position. Also included are a pair of clamping members horizontally alidably housed within the housing structure and movable close to and away from each other for supporting the records except for the lowermost one when the latter is to be fed on to the phonograph turntable in response to the operational mode of the slider block.

6 Claims, 3 Drawing Figures

INTERCHANGEABLE RECORD CHANGER SPINDLE ASSEMBLY

Figure 1:
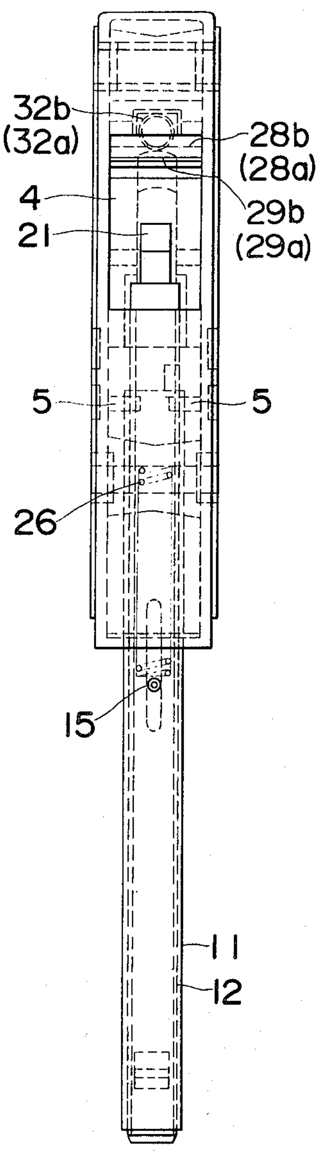

The present invention relates to a readily interchangeable record changer spindle assembly for a phonograph or record player permitting the playing and automatic changing of records each having a center hole of substantially larger diameter than the customary upstanding spindle of the phonograph turntable.

The record changer spindle assembly according to the present invention is particularly useful in a record player of the type wherein the customary upstanding spindle for mounting one or a plurality of records each having a center hole of relatively small diameter can be detachable from the known sleeve about which the platter or turntable rotates. In this respect, the record changer spindle assembly of the present invention is entirely different from the known adaptor adapted to be mounted on the customary upstanding spindle when one or more records each having the center hole of relatively large diameter are to be played.

The present invention has for its essential object to provide a record changer spindle assembly which can be readily interchangeable with the customary upstanding spindle of relatively small diameter and which insures the proper depositing and centering of one record after the other on the platter or turntable.

According to the present invention, the record changer spindle assembly generally comprises a primary support consisting of at least two supporting members radially outwardly protruding from the periphery of the spindle housing rather like the supporting struts of an umbrella and a secondary support consisting of at least two clamping blocks capable of radially outwardly protruding from the periphery of the spindle housing for supporting the records in position except for the lowermost one of them which is resting on the supporting members of the primary support when said lowermost record is to be fed on to the platter or turntable. In practice, while one record is being played, the remainder of the stack of records mounted on said record changer spindle assembly is supported on the primary support. When the next lowermost record in the stack is to be played, the secondary support comes into action and supports all the records in the stack except for the lowermost one. The primary support is then withdrawn within the spindle housing so that the lowermost record falls donw the spindle assembly and on to the turntable. The abovementioned sequential operation is carried out by a drive mechanism operatively associated in any known manner with the movement of a tone arm carrying the pickup stylus.

In the abovementioned arrangement, an essential feature of the present invention resides in that each of the clamper blocks is formed with a downwardly outwardly inclined and transversely arched surface and a knife edge outwardly projecting from the lowermost edge of said inclined and arched surface. The provision of this surface and knife edge on each of the clamper blocks ensures that the knife edges receive a portion of the total weight of the record stack with said inclined and arched surfaces applying a pushing force from both sides with which some or all of the records in the stack are tended to be upwardly lifted without imposing the total weight thereof on the knife edges.

An additional feature of the present invention resides in that the clamper blocks are horizontally slidably carried in the spindle housing, the sliding movement of said clamper blocks in the opposite directions away from and toward each other being effected in response to a slider block having a substantially triangular head portion slidably engaged in between said clamper blocks.

Figure 2:
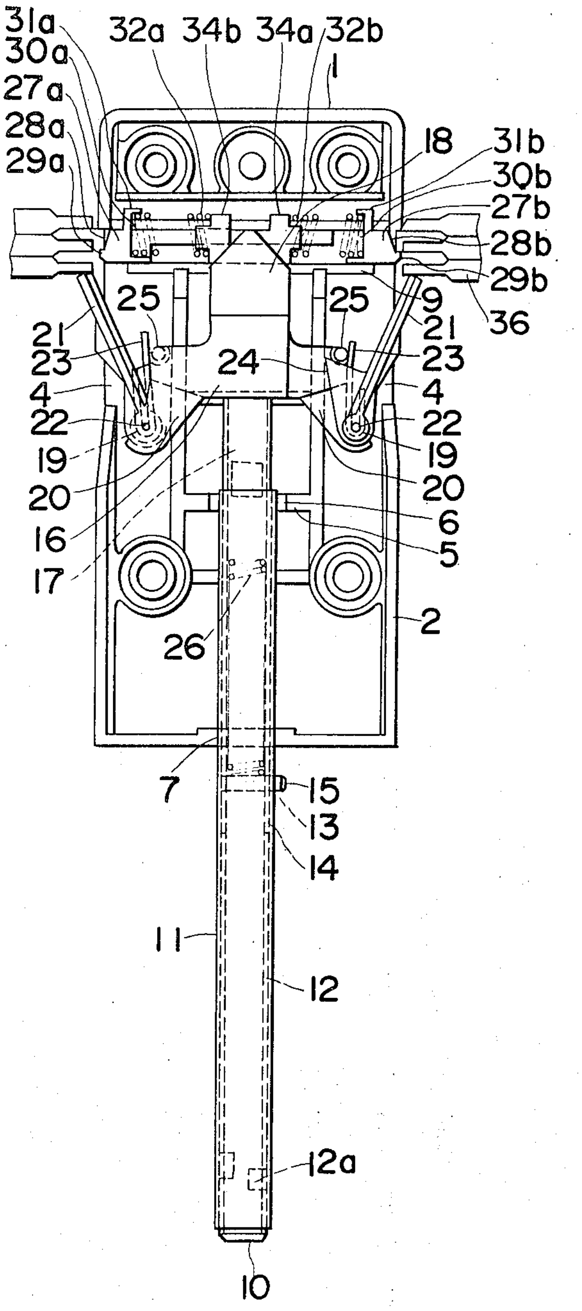
Figure 3:
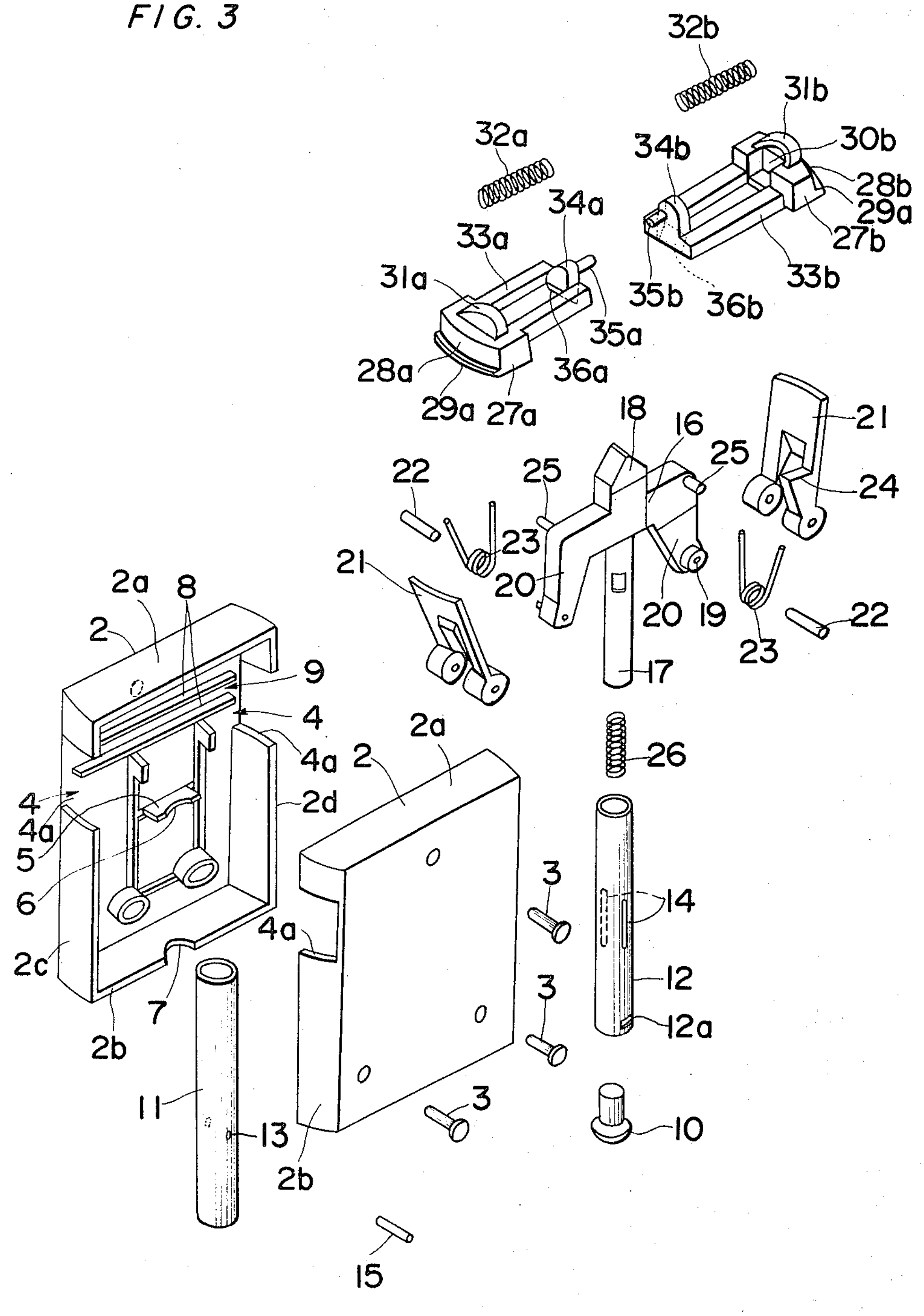

These and other objects and features of the present invention will become apparent from the following description taken in conjunction with a preferred embodiment thereof with reference to the accompanying drawings, in which;

FIG. 1 is a side elevational view of a record changer spindle assembly constructed in accordance with the present invention, FIG. 2 is a front sectional view of the record changer spindle assembly showing the internal mechanisms thereof with one of the housing halves removed, and FIG. 3 is a schematic exploded view of the record changer spindle assembly constructed in accordance with the present invention.

Referring to FIGS. 1 to 3, the record changer spindle assembly according to the present invention comprises a spindle housing 1 of substantially rectangular box-like shape consisting of a pair of housing halves 2 of the same construction as shown. These housing halves 2 are combined together with the use of suitable fastening members 3, for example, screws, bolts and nuts or others, to provide the particular spindle housing 1. It is to be noted that the spindle housing 1 may be of cylindrical shape and, in either case, the width or diameter thereof must be substantially equal to the diameter of the relatively large, for example, 38 milimeter, center hole of each of records 36 to be mounted on the spindle assembly in a vertically stacked arrangement. It is also to be noted that either of the housing halves 2 may be constructed in the form of a cover or closure plate for the other.

Since the housing halves 2 so far as shown are of the same construction as described above, only one of them will be described for the sake of brevity in connection with the construction of the spindle housing 1. As clearly shown in FIG. 3, the housing half 2 having a pair of upper and lower walls 2*a* and 2*b* and a pair of opposed side walls 2*c* and 2*d*, all integrally formed therewith, is formed at the side walls with a pair of opposed cut-out portions as at 4*a* which, when combined together with the other housing half, provides a pair of opposed windows 4, the function of which will become apparent from the later description. The housing half 2 is provided with a supporting piece 5 having an inward recess 6 of semicircular shape and at the lower wall 2b with another inward recess 7 in alignment with the inward recess 6. These recesses 6 and 7 in one housing half 2 provide respective circular openings in cooperation with those in the other housing half, the center of each of these circular openings being in alignment with respect to each other and in alignment with the axis of symmetry of the spindle housing 1. The housing half 2 is also provided with a pair of spaced guide rails 8 which, in cooperation with those provided in the other housing half, provides a guide groove 9 horizontally extending between the opposed side walls. Both ends of said guide groove 9 respectively terminate at positions substantially adjacent to the opposed windows 4.

Each of the housing halves 2 having the various elements as described above may be of one-piece construction and can be easily manufactured by means of any known die casting or extrusion molding method.

While the spindle housing 1 is constructed in the manner as hereinbefore described, it is rigidly mounted on a tubular stand 11 having an upper end portion non-rotatably and non-detachably extending through the opening, defined by the inward recesses 7, and terminating at the other opening defined by the inward recesses 6. The lower end portion of the stand 11 is adapted to be non-rotatably, but detachably, inserted in the sleeve about which the platter or turntable (not shown) rotates. In this arrangement, the supporting pieces 5 of the housing halves 2 act to retain the upper end of the tubular stand 11 in position with the recesses 6 thereof tightly sandwiching said upper end of the tubular stand 11. The inward recesses 7 of the housing halves 2 also act to retain a substantially intermediate portion of the tubular stand 11 in position while tightly sandwiching it. Though not shown, to ensure that the tubular stand 11 is non-rotatably and non-detachably carried by the spindle housing 1, a suitable fixture may be used in any desired manner.

The tubular stand 11 includes an inner bushing 12 having a length smaller than that of the tubular stand 11. This inner bushing 12 is formed with a pair of opposed slots 14 and is slidably housed within the tubular stand 11. The maximum stroke of the sliding movement of said bushing 12 within the tubular stand 11 is defined by the size of each slot 14 in cooperation with a pin member 15 horizontally extending through said slots 14 and having both ends secured to or pressure-fitted through a pair of opposed holes 13 formed in the tubular stand 11. The bushing 12 is also formed at a portion adjacent to the lowermost end thereof with an engagement opening 12*a*, the function of which will be described later. The opening at the lowermost end of said bushing 12 is closed by a closure member 10.

It is to be noted that, for enabling the spindle assembly of the present invention to be mounted in the center of the platter or turntable, one of the ends of said pin member 15 is outwardly protruded from the periphery of the tubular stand 11 for engagement in a key groove provided in the sleeve about which the platter or turntable rotates.

The primary support for supporting a stack of records 36 from the bottom thereof comprises a slider block 16 formed integrally at an intermediate portion with a tapered head 18 upwardly extending therefrom and a rod portion 17 downwardly extending and rigidly inserted in an upper end portion of the inner bushing 12. This slider block 16 is also formed at both ends thereof with a pair of downwardly suspending arms 20, each having a bearing formed as at 19, and a pair of stopper pins 25. The slider blcok 16 is normally upwardly urged together with the inner bushing 12 with the head portion 18 conditioned as will be mentioned later, by a compression spring 26 loosely housed within the inner bushing 12 and having one end resting on the pin member 15 and the other end engaged against the lowermost end face of the rod portion 17 of said slider block 16.

The primary support further comprises a pair of supporting members 21 of the same construction pivotally carried by the corresponding bearings 19 of the arms 20 of the slider block 16 by means of a pair of pins 22. These supporting members 21 are normally pivoted about the corresponding pins 22 in opposite directions by by resilient members 23 loosely mounted on the bearings 19 whereby, in the assembled condition, said supporting members 21 radially outwardly protrude from the respective windows 4 of the spindle housing 1. However, the radially outward protrusion of the supporting members 21 are restricted by abutments respectively formed in the supporting members 21 as at 24 for engagement with the corresponding stopper pins 25. As will be described later, these supporting members 21 can be radially inwardly withdrawn within the spindle housing through the windows 4 against the resilient members 23 when the slider block 18 is downwardly moved together with the inner bushing 12 against the compression spring 26. More specifically, as the slider block 16 descends accompanied by the downward movement of the inner bushing 12, the then radially outwardly expanded supporting members 21 are folded toward each other, while pivoting about the respective pins 22 against the resilient members 23, by the sliding engagement with the lower edges of the windows 4 of the spindle housing 1 and, thus, withdraw into the spindle housing 1 through the windows 4.

The secondary support for supporting the stack of records 36 except for the lowermost one of them which is supported by the primary support from the bottom when said lowermost record is to be fed on to the platter or turntable comprises a pair of first and second clamper blocks 27*a* and 27*b* being so sized as to be slidably supported in the guide groove 9 defined by two pairs of spaced guide rails 8 of the housing halves 2 as described hereinbefore. These clamper blocks 27*a* and 27*b* are of similar construction with respect to each other and each is formed at one surface, facing the corresponding window 4 of the spindle housing 1, with a downwardly outwardly inclined and transversely arched surface 28*a* or 28*b*. At the lowermost edge of said surface 28*a* or 28*b* is formed a knife 29*a* or 29*b* outwardly protruding therefrom for, as will be described later, engagement in a space formed between a relatively thin central portion of the lowermost record and that of a record immediately above said lowermost record for the purpose of supporting the records in the stack except for the lowermost one. The provision of the inclined and arched surface 28*a* or 28*b* on both clamper blocks 27*a* and 27*b* is especially effective, when said clamper blocks are moved away from each other in a manner as will be described later with the knife edge 29*a* or 29*b* exposed outside the spindle housing 1 through the corresponding window 4, to apply a pushing force with which some or all of the records 36 except for the lowermost one are tended to be upwardly lifted. In this way the knife edges 29*a* and 29*b* can, so far from receiving the total weight of the records supported by the secondary support, suffice to receive a portion of said total weight. In view of this, each of the knife edges 29*a* and 29*b* may have a relatively small depth for the record supporting area.

Each of the clamper blocks 27*a* and 27*b* is also formed at the surface opposed to the surface 28*a* or 28*b* with a recess 30*a* or 30*b* which is covered with a roofing 31*a* or 31*b*, said recess 30*a* or 30*b* in cooperation with said roofing 31*a* or 31*b* forming a socket in which a corresponding end of a compression spring 32*a* or 32*b* is steadily received.

In each of the clamper blocks 27*a* and 27*b*, horizontally extending from the surface thereof on both sides of the recess 30*a* or 30*b* is a pair of spaced arms 33a or 33b, the free ends of said arms 33a or 33b of each pair being rigidly mounted with an end piece 34a or 34b of the construction as will be hereinafter described. However, it is to be noted that the arms 33a of the first clamper block 27a stand on different levels, i.e., in offset relation, with respect to the arms 33b of the second clamper block 27b, but the sum of the thickness of each arm 33a of one pair and that of each arm 33b of the other pair is substantially equal to the space between the guide rails 8.

As clearly shown in FIG. 2, the arms 33a and 33b are slidably overlapped with respect to each other and, so far as shown, the arms 33a are situated over the arms 33b with the end pieces 34a and 34b respectively accommodated in the space between the arms 33b and the space between the arms 33a. With this arrangement in mind, the end pieces 34a and 34b are respectively provided with plug members 35a and 35b, one of said plug members 35a being oriented toward the socket in the second clamper block 27b while the other plug member 35b toward the socket in the first clamper block 27a, which respectively fit into the other ends of the compression springs 32b and 32a.

From the foregoing description, it has now become clear that the compression springs 32a and 32b are respectively retained in between the socket in the clamper block 27a and the plug member 35b and between the socket in the clamper block 27b and the plug member 35a whereby the clamper blocks 27a and 17b are forced to move away from each other.

Each of the end pieces 34a and 34b has an inclined surface formed as at 36a or 36b which slidably engages a corresponding one of the inclined sides of the triangular head portion 18 of the slider block 16. Geometrically, the inclined surfaces 36a and 36b when both clamper blocks 27a and 27b are overlapped in the manner as hereinbefore described, substantially form the sides of an isosceles triangle assumed by the shape of the head portion 18 of the slider block 16. By this arrangement, it is clear that, as the inner bushing 12 and hence the slider block 16 is further upwardly shifted a predetermined distance, both clamper blocks 27a and 27b that are normally urged to move away from each other by the compression springs 32a and 32b thereby to permit the surfaces 28a and 28b and the edges 29a and 29b to radially outwardly expand from the corresponding windows 4 of the spindle housing 1 can be drawn toward each other against the compression springs 32a and 32b thereby to permit the surfaces 28a and 28b and the edges 29a and 29b to radially inwardly withdraw into the spindle housing 1 through the corresponding windows 4.

It is to be noted that each of the clamper blocks 27a and 27b provided with the various elements such as indicated by the reference numerals 28a to 36a or 28b to 36b, except for the compression spring 32a or 32b which is obviously separate from the clamper block 27a or 27b, may be of one-piece construction. It is also to be noted that one of the compression springs 32a and 32b may be omitted depending upon the choice of design. However, the employment of the two compression springs as in the preferred embodiment shown of the present invention is recommended in view of the fact that steady and balanced sliding movement of the first and second clamper blocks 27a and 27b in the opposite directions away from and close to each other can be advantageously appreciated. Furthermore, the composite resiliency of both of the compression springs 32a and 32b, or the resiliency of one of the compression springs 32a and 32b if the other is omitted, must be greater than the resiliency of the compression spring 26, the latter resiliency being so small as to be compressed by the weight of a single record of the record stack.

In practice, the record changer spindle assembly according to the present invention functions as follows. Assuming now that an external pushing force is applied to the lowermost end of the inner bushing 12 while the spindle assembly is mounted on the platter or turntable with the lower end portion of the tubular stand 11 inserted in the sleeve about which the platter or turntable rotates, the various internal mechanisms of the spindle assembly are conditioned such as shown in FIG. 2. In other words, so long as the external pushing force is applied as described, the slider block 16 that is normally upwardly shifted by the compression spring 26 is further upwardly shifted a predetermined distance with the head portion 18 wedged in between the inclined surfaces 36a and 36b of the end pieces 34a and 34b thereby permitting the clamper blocks 27a and 27b to be moved close to each other against the compression springs 32a and 32b with the surfaces 28a 28b and the knife edges 29a and 29b withdrawn within the spindle housing 1. During this condition, if a plurality of records 36 are mounted on the spindle assembly, they are supported by the primary support in such a manner that the lowermost one of them rests on the supporting members 21 while the others on the lowermost record.

As the external pushing force gradually reduces accompanying a corresponding descend of the inner bushing 12, together with the slider block 16, the head portion 18 of said slider block 16 tends to separate from its engagement with the inclined surface 36a and 36b. However, by the compression springs 32a and 32b, the first and second clamper blocks 27a and 27b are forced to move away from each other with the inclined surfaces 36a and 36b in constantly sliding engagement with the sides of the head portion 18 during the descend of said slider block 16. Thus, it is clear that, at the time the slider block 16 completes its downward movement a predetermined distance which is substantially equal to the predetermined distance the block 16 had been further upwardly shifted by the external pushing force, the secondary support is brought into operation to support the records except for the lowermost one of them in the manner as hereinbefore described.

Simultaneously therewith, the lowermost record resting on the supporting members 21 of the primary support causes the compression spring 26 to be compressed thereby permitting the engagement hole 12a adjacent to the lowermost end of the inner bushing 12 to emerge from the lowermost opening of the tubular stand 11. Upon emergence of the engagement hole 12a out of the tubular stand 11, a suitable engaging member (not shown) engages in said engagement hole 12a thereby to forcibly pull said inner bushing 12 in the downward direction against the compression spring 26. During the period in which the inner bushing 12 is downwardly pulled by the engaging member, the supporting members 21 carrying thereon the lowermost record descends and are, then, by engagement with the lower edges of the windows 4 of the spindle housing 1, radially inwardly folded so as to withdraw into the spindle housing 1. Upon complete withdrawal of the supporting members 21 within the spindle housing 1, the lowermost record is permitted to fall by its own gravity on to the platter or turntable.

The remaining records on the spindle assembly are supported by the secondary support in the manner as hereinbefore described.

After the lowermost record has been fed on to the platter or turntable in the manner as hereinbefore described, the external pushing force is again applied to the lowermost end of the inner bushing 12 causing the slider block 16 to establish the initial condition as shown in FIG. 2. However, it is to be noted that during this upward movement of the inner bushing 12, release of the engaging member from the engagement hole 12a takes place.

Thus, from the foregoing description, one cycle of the operation of the changer spindle constructed in accordance with the present invention has become clear.

Removal of the whole number of the records that have been stacked on the platter or turntable can be practised in a similar way as has been heretofore practised. This is because, when the record player mounted with the changer spindle assembly of the present invention is in the inoperative position, the head portion 18 of the slider block 16 is in the further elevated position and, consequently, the clamper blocks 27*a* and 27*b* are moved close to each other with the surfaces 28*a* and 28*b* and the knife edges 29*a* and 29*b* withdrawn within the spindle housing 1 without obstructing the passage of the records to be removed through the changer spindle assembly.

Finally, it is to be noted that means for applying the external pushing force to the lower end of the inner bushing 12 and the engaging member engageable in the engagement hole 12*a* of the inner bushing 12 are provided in a common drive mechanism operatively associated with the movement of a tone arm (not shown) of any known construction whereby the records on the changer spindle assembly are successively fed on to the platter or turntable at known intervals and in a known sequential mode of operation with respect to the movement of the tone arm. The details of either of said means and said engaging member are herein omitted since the present invention is not directed the inclusion of them in the record changer spindle assembly.

Although the present invention has been fully described by way of example with reference to the accompanying drawings, it is to be noted that various changes and modifications are apparent to those skilled in the art. Therefore, these changes and modifications should be, unless otherwise departing from the scope of the present invention, construed as included within said scope of the present invention.

What is claimed is:

1. A record changer spindle assembly interchangeably utilizable in a phonograph or record player in association with records each having a relatively large center hole through which said records are mounted on the record changer spindle assembly in a vertically stacked arrangement, which comprises; a housing structure for mounting said records thereon in the vertically stacked arrangement;

vertically slidable means housed within said housing structure comprised of;

a slider block formed with a substantially triangular head portion operatively associated with said clamping members for operating the latter to alternately support and release the records except for the lowermost one of them, and also with a pair of arm members to which said supporting members are respectively pivotally connected, said arm members being positioned on both sides of said substantially triangular head portion, and a pair of resilient members operatively carried by said arm members for urging said support members in the opposite directions away from each other to maintain said supporting members in the radially outwardly protruding position;

a primary support including at least a pair of supporting members pivotally carried by said vertically slidable means and adapted to be radially outwardly protruded from the periphery of the housing structure so as to support the lowermost one of said records mounted on the changer spindle assembly, means associated with said primary support and said housing such that said primary support is operable in response to the vertical sliding movement of said vertically slidable means in such a manner that, when said vertically slidable means is upwardly shifted, said supporting members are in position to support the lowermost one of said records and, when said vertically slidable means is downwardly shifted, said supporting members are withdrawn within the housing structure, thereby to permit the lowermost one of said records to fall by gravity on to a turntable of the phonograph or record player; and a secondary support including at least a pair of clamping members horizontally slidably housed within the housing structure for supporting all but the lowermost record, said secondary support being operable in response to the vertically sliding movement of said vertically slidable means in such a manner that, when said vertically slidable means is in the upwardly shifted position, said clamping members are withdrawn within the housing structure, thereby to render all of the records to be supported by said primary support and, when said vertically slidable means is in the downwardly shifted position, said clamping members are moved away from each other to project radially outwardly from the periphery of the housing structure, thereby to support all but the lowermost record; each of said clamping members being formed with a substantially horizontal knife edge adapted to be engageable in between the lowermost one of the records and the remaining records and a downwardly outwardly inclined and transversely arched surface for, when said clamping members are moved away from each other to radially outwardly project from the periphery of the housing structure, applying a pushing force with which said remaining records are tended to be upwardly shifted, thereby to permit the total weight of said records to be received by said knife edge in cooperation with said arched surface.

2. A record changer spindle assembly as claimed in claim 1, wherein said slider block is also formed with a pair of stoppers each acting to restrict an unnecessary radially outward protrusion of the corresponding one of said supporting members in cooperation with a corresponding projection formed in each of said clamping members.

3. A record changer spindle assembly as claimed in claim 1, wherein said housing structure comprises a pair of housing halves each having an interior surface formed with a pair of spaced guide rails for providing a guide groove when said housing halves are connected with each other, said guide groove accommodating therein said clamping members for horizontally slidably supporting said clamping members in position.

4. A record changer spindle assembly as claimed in claim 1 wherein said housing structure is of substantially rectangular box-like shape.

5. A record changer spindle assembly interchangeably utilizable in a phonograph or record player in association with records each having a relatively large center hole through which said records are mounted on the record changer spindle assembly in a vertically stacked arrangement, which comprises; a housing structure for mounting said records thereon in the vertically stacked arrangement;

vertically slidable means housed within said housing structure; a primary support including at least a pair of supporting members pivotally carried by said vertically slidable means and adapted to be radially outwardly protruded from the periphery of the housing structure so as to support the lowermost one of said records mounted on the changer spindle assembly, means associated with said primary support and said housing such that said primary support is operable in response to the vertical sliding movement of said vertically slidable means in such a manner that, when said vertically slidable means is upwardly shifted, said supporting members are in position to support the lowermost one of said records and, when said vertically slidable means is downwardly shifted, said supporting members are withdrawn within the housing structure, thereby to permit the lowermost one of said records to fall by gravity on to a turntable of the phonograph or record player; and a secondary support including at least a pair of clamping members horizontally slidably housed within the housing structure for supporting all but the lowermost record, a pair of compression springs one being retained between the socket of one of said clamping members and the plug member of the other clamping member and the other being retained between the socket of said other clamping member and the plug member of said one clamping member, whereby said clamping members are normally urged to move away from each other, but movable close to each other against said compression springs when the triangular head portion of the slider block of said vertically slidable means is wedged in between said inclined surfaces of said clamping members with the slider block in the upwardly shifted position, said secondary support being operable in response to the vertically sliding movement of said vertically slidable means in such a manner that, when said vertically slidable means is in the upwardly shifted position, said clamping members are withdrawn within the housing structure, thereby to render all of the records to be supported by said primary support and, when said vertically slidable means is in the downwardly shifted position, said clamping members are moved away from each other to project radially outwardly from the periphery of the housing structure, thereby to support all but the lowermost record; each of said clamping members being formed with a substantially horizontal knife edge adapted to be engageable in between the lowermost one of the records and the remaining records and a downwardly outwardly inclined and transversely arched surface for, when said clamping members are moved away from each other to radially outwardly project from the periphery of the housing structure, applying a pushing force with which said remaining records are tended to be upwardly shifted, thereby to permit the total weight of said records to be received by said knife edge in cooperation with said arched surface.

6. A record changer spindle assembly interchangeably utilizable in a phonograph or record player in association with records each having a relatively large center hole through which said records are mounted on the record changer spindle assembly in a vertically stacked arrangement, which comprises; a housing structure for mounting said records thereon in the vertically stacked arrangement; vertically slidable means housed within said housing structure; a primary support including at least a pair of supporting members pivotally carried by said vertically slidable means and adapted to be radially outwardly protruded from the periphery of the housing structure so as to support the lowermost one of said records mounted on the changer spindle assembly, means associated with said primary support and said housing such that said primary support is operable in response to the vertical sliding movement of said vertically slidable means in such a manner that, when said vertically slidable means is upwardly shifted, said supporting members are in position to support the lowermost one of said records and, when said vertically slidable means is downwardly shifted, said supporting members are withdrawn within the housing structure, thereby to permit the lowermost one of said records to fall by gravity on to a turntable of the phonograph or record player; and a secondary support including at least a pair of clamping members horizontally slidably housed within the housing structure for supportall but the lowermost record, said secondary support being operable in response to the vertically sliding movement of said vertically slidable means in such a manner that, when said vertically slidable means is in the upwardly shifted position, said clamping members are withdrawn within the housing structure, thereby to render all of the records to be supported by said primary support, and when said vertically slidable means is in the downwardly shifted position, said clamping members are moved away from each other to project radially outwardly from the periphery of the housing structure, thereby to support all but the lowermost record; each of said clamping members being formed with a substantially horizontal knife edge adapted to be engageable in between the lowermost one of the records and the remaining records and a downwardly outwardly inclined and transversely arched surface for, when said clamping members are moved away from each other to radially outwardly project from the periphery of the housing structure, applying a pushing force with which said remaining records are tended to be upwardly shifted, thereby to permit the total weight of said records to be received by said knife edge in cooperation with said arched surface; and a tubular stand having an upper end portion rigidly mounted with the housing structure and the lower end portion adapted to be detachably inserted in alignment with the center of the phonograph turntable and said vertically slidable means further including an inner bushing slidably housed within said tubular stand and having the upper end rigidly carrying the slider block and the other lower end portion formed with an engagement opening, and a compression spring housed within said inner bushing for normally upwardly urging said inner bushing for normally upwardly urging said inner bushing and hence the slider block thereby to permit the supporting members to be radially outwardly protruding from the periphery of the housing structure, said inner bushing being capable of descending a predetermined distance against said compression spring upon receipt of the weight of the lowermost one of the records transmitted through said supporting members so as to permit said engagement opening to emerge from the lower and extremity of the tubular stand in position ready to be engaged by a suitable pull-off mechanism for causing said inner bushing to be further downwardly moved until said supporting members are withdrawn within the housing structure.

* * * * *

UNITED STATES PATENT OFFICE
CERTIFICATE OF CORRECTION

Patent No. 3,814,440 Dated June 4, 1974

Inventor(s) TOMOO ATSUMI

It is certified that error appears in the above-identified patent and that said Letters Patent are hereby corrected as shown below:

the name of the inventor should read -- Tomoo Atsumi -- instead of "Tomoo Aisumi"

Signed and sealed this 1st day of October 1974.

(SEAL)
Attest:

McCOY M. GIBSON JR.
Attesting Officer

C. MARSHALL DANN
Commissioner of Patents